United States Patent
Hosain et al.

(10) Patent No.: US 7,184,788 B1
(45) Date of Patent: Feb. 27, 2007

(54) SYSTEM AND METHOD FOR LOCATING A CELLULAR SERVICE

(75) Inventors: Syed Zaeem Hosain, San Jose, CA (US); Robert Fultz, Boulder Creek, CA (US); James Sotelo, Scotts Valley, CA (US)

(73) Assignee: Aeris.net, San Jose, CA (US)

( * ) Notice: Subject to any disclaimer, the term of this patent is extended or adjusted under 35 U.S.C. 154(b) by 0 days.

(21) Appl. No.: 09/549,450

(22) Filed: Apr. 14, 2000

Related U.S. Application Data

(63) Continuation-in-part of application No. 09/425,485, filed on Oct. 22, 1999, now abandoned.

(51) Int. Cl.
*H04B 7/00* (2006.01)
*H04Q 7/20* (2006.01)

(52) U.S. Cl. ............... 455/515; 455/410; 455/411; 455/435.2; 455/552.1; 455/553.1

(58) Field of Classification Search ............ 455/434, 455/515, 552, 553, 552.1, 553.1, 410, 411, 455/419, 420, 403, 466, 550.1, 575, 435.2
See application file for complete search history.

(56) References Cited

U.S. PATENT DOCUMENTS

| | | | | |
|---|---|---|---|---|
| 5,159,625 A | * | 10/1992 | Zicker | 455/432 |
| 5,555,286 A | * | 9/1996 | Tendler | 455/404.2 |
| 5,586,338 A | | 12/1996 | Lynch et al. | |
| 5,613,204 A | * | 3/1997 | Haberman et al. | 455/432 |
| 5,790,952 A | * | 8/1998 | Seazholtz et al. | 455/432 |
| 5,845,203 A | | 12/1998 | LaDue | |
| 5,870,674 A | * | 2/1999 | English | 455/432 |
| 5,903,832 A | * | 5/1999 | Seppanen et al. | 455/414 |
| 5,905,955 A | * | 5/1999 | Bamburak et al. | 455/434 |
| 6,044,265 A | * | 3/2000 | Roach, Jr. | 455/419 |
| 6,311,060 B1 | * | 10/2001 | Evans et al. | 455/426 |
| 6,405,038 B1 | * | 6/2002 | Barber et al. | 455/434 |
| 6,466,802 B1 | * | 10/2002 | Blakeney et al. | 455/552 |

OTHER PUBLICATIONS

"EE E6950 Wireless and Mobile Networking Class Note", Chia_wei Hu, et al., http://www.ctr.columbia.edu/~sang/courses/ee6950/note.html, 5 pp., Oct. 13, 1999.

* cited by examiner

*Primary Examiner*—Matthew Anderson
*Assistant Examiner*—Sujatha Sharma
(74) *Attorney, Agent, or Firm*—Blakely, Sokoloff, Taylor & Zafman LLP

(57) ABSTRACT

A method for determining whether a particular service is provided by a cellular service provider comprising: listening for a page which includes a particular number plan area code ("NPA") in a first frequency block; if the page is not heard in the first frequency block within a specified time period, listening for a page in a second frequency block which includes the particular NPA; and determining that the service is provided in the frequency block in which the page is sensed.

14 Claims, 9 Drawing Sheets

| Coverage Available ON | | Response | |
|---|---|---|---|
| A-Block | B-Block | A-Block | B-Block |
| None | None | None | None |
| None | Test/Non-commercial | None | NEGBEACON |
| None | Commercial | None | POSBEACON |
| Test/Non-commercial | None | NEGBEACON | None |
| Test/Non-commercial | Test/Non-commercial | NEGBEACON | NEGBEACON |
| Test/Non-commercial | Commercial | NEGBEACON | POSBEACON |
| Commercial | None | POSBEACON | None |
| Commercial | Test/Non-commercial | POSBEACON | NEGBEACON |
| Commercial | Commercial | POSBEACON | POSBEACON |

FIG. 8

SYSTEM AND METHOD FOR LOCATING A CELLULAR SERVICE

PRIORITY

This application is a continuation-in-part of U.S. Ser. No. 09/425,485, filed Oct. 22, 1999 now abandoned, entitled "System and Method for Locating a Cellular Service."

BACKGROUND OF THE INVENTION

1. Field of the Invention

This invention relates generally to the field of mobile and wireless communication systems. More particularly, the invention relates to an improved system and method for locating cellular service in a particular area.

2. Description of the Related Art

Cellular Networks

A typical cellular network is illustrated in FIG. 1. Some of the primary components include a group of mobile switching centers 110, 115 (hereinafter "MSCs"); a series of base stations 140–142 and 150–151; and one or more a mobile units 130. Each mobile unit 130 includes an RF module (not shown) for transmitting and receiving cellular signals. The MSCs 110, 115 communicate across an interface 150 to one or more additional networks 120 (e.g., the public switched telephone network).

The mobile station 130 contains a radio frequency ("RF") module (not shown) which allows the mobile station 130 to tune to a particular frequency as designated by the cellular network. The "cell" site is defined by the area (e.g., line 170 in FIG. 1) surrounding each individual base station 140. In operation, each base station 140–142; 150–151 acts as an interface between the MSCs 110, 115 and the mobile stations 130; transmitting and receiving control and voice signals to and from each, respectively.

The MSCs 110, 115 perform the primary control functions for the cellular network, routing calls between the base stations 140–142; 150–151 and other networks 120 and performing a variety of call management operations (e.g., performing testing and diagnostics; monitoring network traffic . . . etc). Two databases are maintained at the MSCs 110, 115 for tracking cellular subscribers: the home location register (hereinafter "HLR") and the visitor location register (hereinafter "VLR").

Every cellular user belongs to one HLR, which is associated with a particular cellular network service provider. Information relating to the customer's account (e.g., subscribed services, account payments) is stored in the HLR along with customer tracking information which identifies the customer's current location within the overall cellular network (i.e., either within or outside of the subscribed cellular provider's network).

The VLR keeps track of customers who are operating outside of their cellular provider's network. For example, if MSC 110 and MSC 115 were operated by different service providers and mobile station 130 moved outside of a MSC 110's range (where he is a subscriber/user) and into MSC 115's range, then MSC 115 would open a VLR entry for the mobile station 130 and would notify MSC 110 (which would then update its associated HLR for the mobile station 130).

The communication interface between a mobile station 130 and a base station 140 can be broken down into two pairs of channels as illustrated in FIG. 2: a pair of voice channels and a pair of control channels. The two voice channels, the reverse voice channel ("RVC") 210 and the forward voice channel ("FVC") 220 carry digital or analog voice signals to and from the mobile station, respectively. The two control channels, the reverse control channel ("RECC") 230 and the forward control channel ("FOCC") 240 carry control signals (e.g., the number to dial, the paging signal indicating an incoming call . . . etc) to and from the mobile station 130, respectively. When the voice channels are not in operation, the mobile station 130 must continually monitor its designated control channels for event triggers.

Each cellular service provider broadcasts a unique System Identification Number (hereinafter "SID") on its FOCC within the cellular provider's allocated frequency range. Accordingly, a properly equipped cellular telephone can determine which service company is providing service on a given channel by identifying the SID. Usually the SID contains three digits.

A and B Cellular Frequency Blocks

In the early 1970's, the Federal Communications Commission ("FCC") allocated 40 MHz in the 800 MHz frequency spectrum for the deployment of a cellular mobile communications system. In 1980, in order to improve competition, the FCC mandated that two cellular carriers be licensed in each market. It was the FCC's view that such an approach would provide some competitive advantages, even though it would not amount to complete market freedom.

Hence, the 40 MHz bandwidth was split into two ranges, labeled "block A" and "block B" (also known as "band A" and "band B"). Block A was originally designated for "non-wire-line" companies, i.e., those companies not engaged in providing traditional telephone service, and block B was designated for "wire-line" companies, i.e., those companies providing traditional wired telephone service. Each block is operated essentially independently, with separate systems, cells, equipment, switches, etc. Most cellular devices are capable of operating in either block, but not simultaneously.

Control Channel Packet Transmissions

The assignee of the present application has developed proprietary, two-way, wireless data communications technologies in which data packets known as Remote Access Application Messages ("RAAM"™) or Control Channel Application Data ("CCAD"™) are transmitted over cellular control channels to and from cellular RF modules. See, e.g., U.S. Pat. No. 5,845,203 which is assigned to the assignee of the present application. These data packets enable a variety of new applications beyond traditional cellular voice communications, including monitoring and control of remote devices. These new systems operate completely within, and are transparent to, current established cellular networks, without usurping or compromising the voice-based infrastructure and revenue generation.

Problems may occur, however, when RF modules equipped to use the foregoing proprietary technology move from one cellular market to another. More particularly, until both the "block A" and "block B" carriers in all markets select the technology for deployment, there is a natural separation of service availability between the two frequency blocks. In addition, driven by mergers and acquisitions in the Cellular industry, some cellular carriers may support the service on "block A" in some markets and "block B" in others.

Since the various RF modules employing this technology must follow normal cellular protocol standards, applications executed on these modules should be capable of changing the frequency use (i.e., select block A or block B) depending on the market in which they are deployed. For physically fixed devices, it is a relatively simple matter to program a frequency block in which to operate. Mobile RF devices, however, which move from market to market, create a more difficult problem.

For example, mobile devices may move from a market where the only cellular carrier providing the service is available on block B to a market where the only carrier providing the service is available on block A. This necessitates a change in operating frequencies that the RF module uses for service. Moreover, until carriers providing the service are available throughout North America on both A and B blocks, RF modules need to be capable of determining if neither carrier in a market provides the service. Conversely, if both block A and block B carriers provide the service, some mechanism should be available for selecting the preferred carrier between the two.

Accordingly, what is needed is a system and method for determining the presence of a cellular service in a particular region. What is also needed is a system and method for switching from a first cellular block to a second cellular block when a cellular service has not been detected in the first cellular block.

SUMMARY OF THE INVENTION

A method for determining whether a particular service is provided by a cellular service provider comprising: listening for a page which includes a particular number plan area code ("NPA") in a first frequency block; if the page is not heard in the first frequency block within a specified time period, listening for a page in a second frequency block which includes the particular NPA; and determining that the service is provided in the frequency block in which the page is sensed.

BRIEF DESCRIPTION OF THE DRAWINGS

A better understanding of the present invention can be obtained from the following detailed description in conjunction with the following drawings, in which:

FIG. 8 illustrates a table of responses to a coverage determination request according to an embodiments of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Hardware/Software Architecture

Embodiments of the present invention include various steps, which will be described below. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

One Embodiment of a System and Method for Locating a Cellular Service

Figure 6:
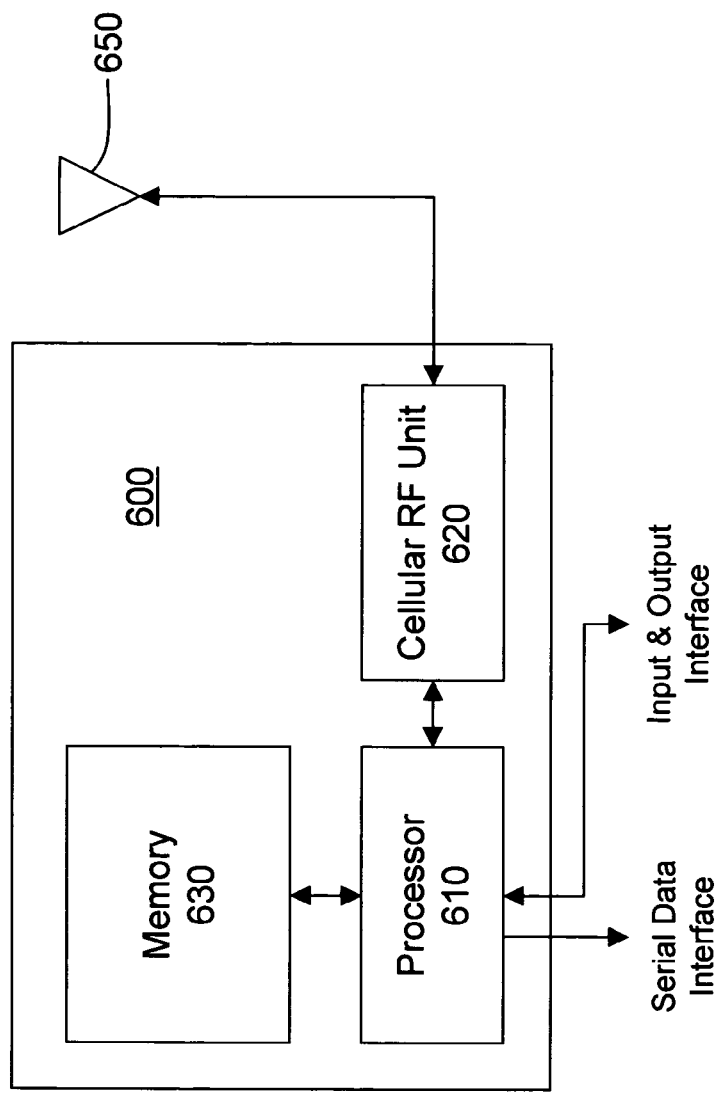
FIG. 6 illustrates an exemplary RF device employed in one embodiment of the invention.

An exemplary RF module 600 used to implement elements of the system and method is illustrated in FIG. 6. The RF module 600 includes a cellular transceiver unit 620 for transmitting and receiving packetized data over cellular control channels. Also illustrated is a processor 610, which may be a Digital Signal Processor ("DSP"), a general purpose processor or a microcontroller, which controls the RF module and executes the cellular processing instructions/logic. A memory section 630 stores one or more RF module programs and parameters, and may also be used to buffer incoming/outgoing data. Other elements of the illustrated embodiment of the RF module 600 include a serial connection for transmitting/receiving data/instructions from external devices; power connections; I/O connections; and additional status pins (e.g., service available flags, multiple channel flags, analog signal strength flags . . . etc).

In one embodiment, RF modules are continually updated to include SID tables which identify markets that provide the service described herein and markets that do not. In some instances, a complete SID table (i.e., listing of all 2500+ SIDs) is not necessary if the RF module is used in a mobile station with a limited geographical range (e.g., only on the east coast). Limiting the SID table in this manner will help to save memory for other applications in the RF module.

SID Table Search

Figure 3:
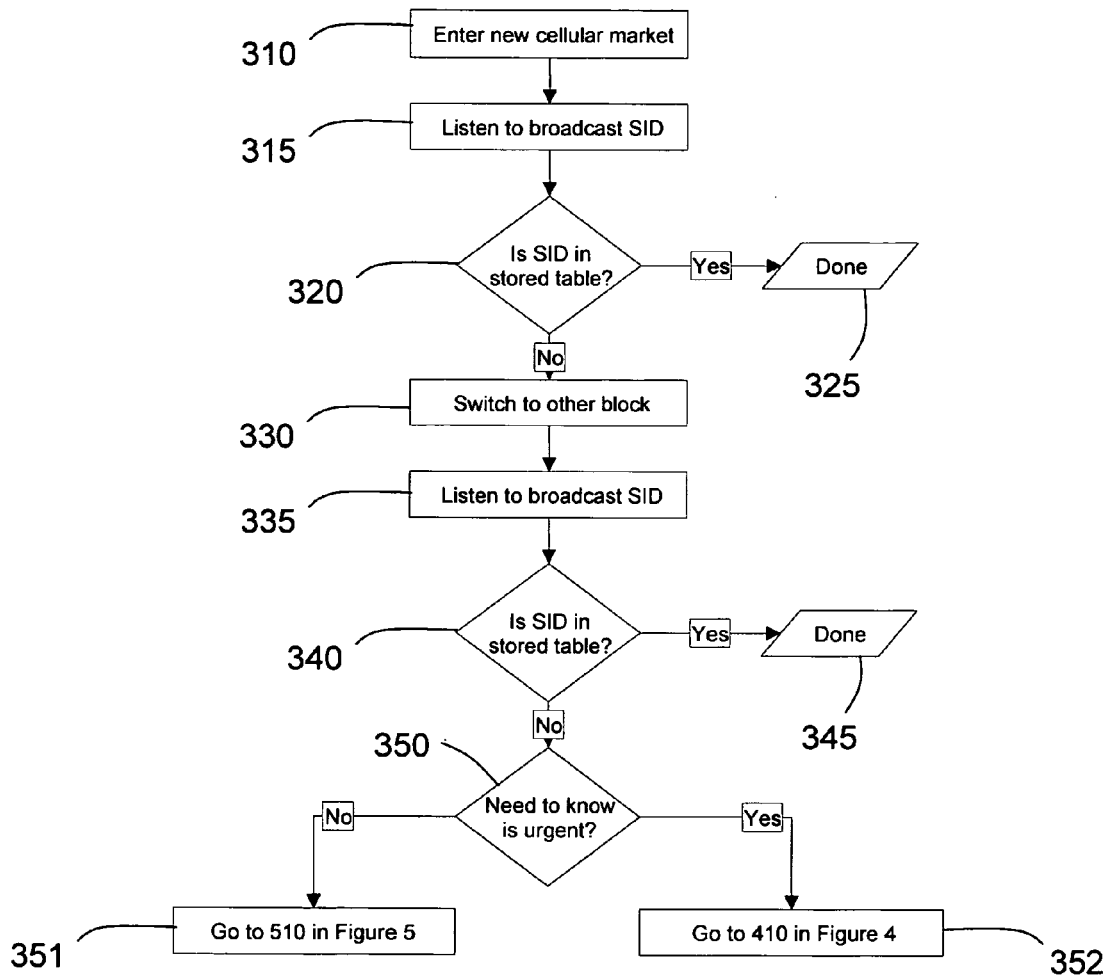
FIG. 3 illustrates a flowchart which includes elements of the present invention.

An RF module may use the SID tables to determine whether to use block A or block B in a particular cellular market by performing the process illustrated in FIG. 3. At step 310, the RF module enters a new market (or is powered up in a new market) and hears a new SID broadcast over the air on the FOCC at step 315. If this new SID is different from the previous SID, the application looks up the SID in its stored SID tables. If the new received SID is in the table (a determination made at step 320), the market provides the service and the process is complete (step 325).

If the new SID is not in the table, however, the application switches the RF module to the alternative frequency block (block A or block B) at step 330 and listens to the SID on that block at step 335. If the other block has a SID that is in the table (step 340), then once again, the process is complete (step 345).

Figure 4:
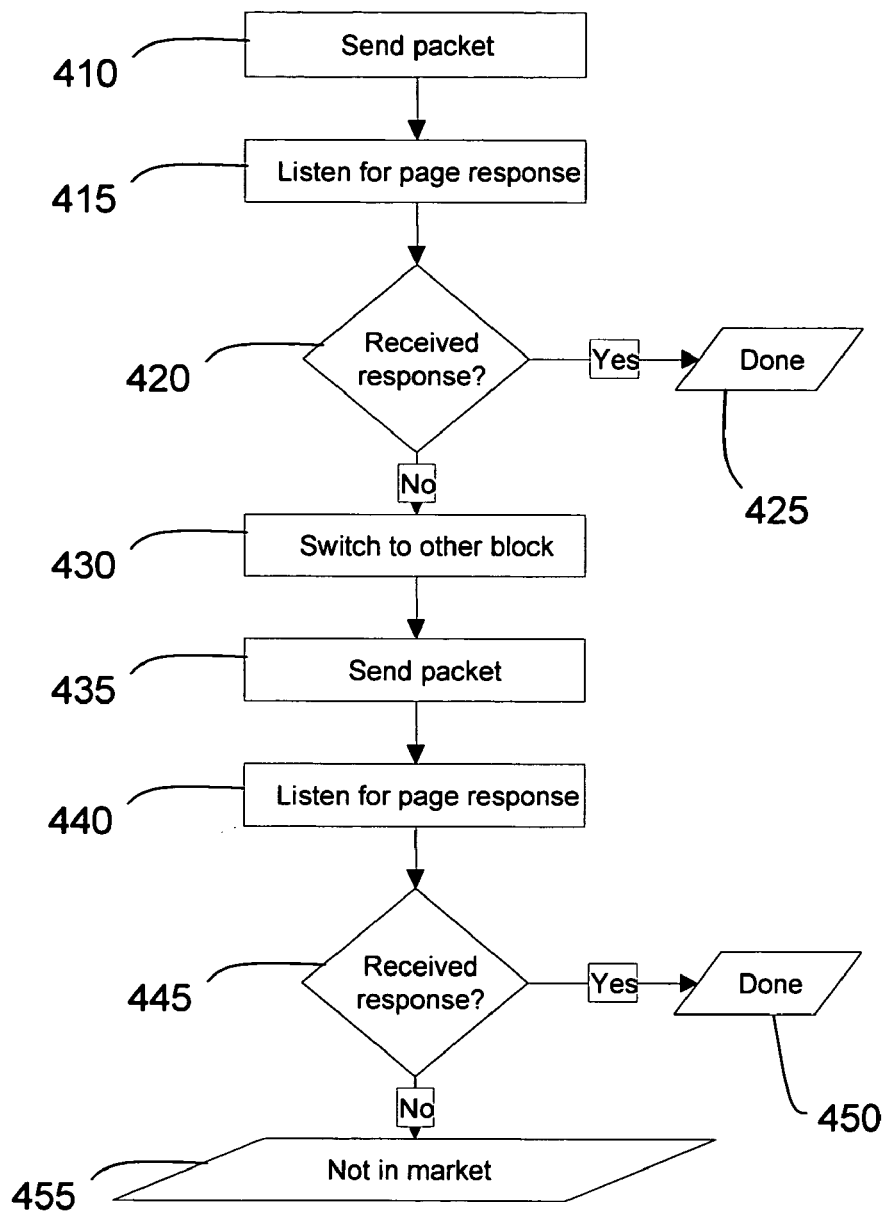
FIG. 4 illustrates a flowchart which sets forth additional features of the invention.

If the other SID is also not in the table, the RF module application must make a decision as to how urgently it "needs to know" whether a local cellular carrier provides the service (step 350). If the "need to know" is not urgent, then the RF module will enter the search process at step 510 in FIG. 5. If the search algorithm fails, then the RF module will enter a "beacon" mode as described in detail below. If, however, the "need to know" is urgent, then the RF module application enters an "urgent" process starting at 410 in FIG. 4.

Urgent System and Method

The "urgent" system and method is used in situations where the RF device must determine service capability as quickly as possible (i.e., where the "search" and "beacon" processes described below are not timely enough). In one embodiment, this process consumes at least two data packet transmissions—both a reverse data transmission (RECC channel) and a forward cellular page (FOCC channel). The process may transmit/receive packets at a faster rate depending on the distance covered by the mobile RF device through multiple SID changes. However, the RF module application may be programmed to intelligently choose to invoke this process, i.e., only invoking it when a serious exception has occurred (e.g., vehicle theft). This process may be useful in an embodiment where service charges from the cellular carriers are based on packet transmissions.

Figure 1:
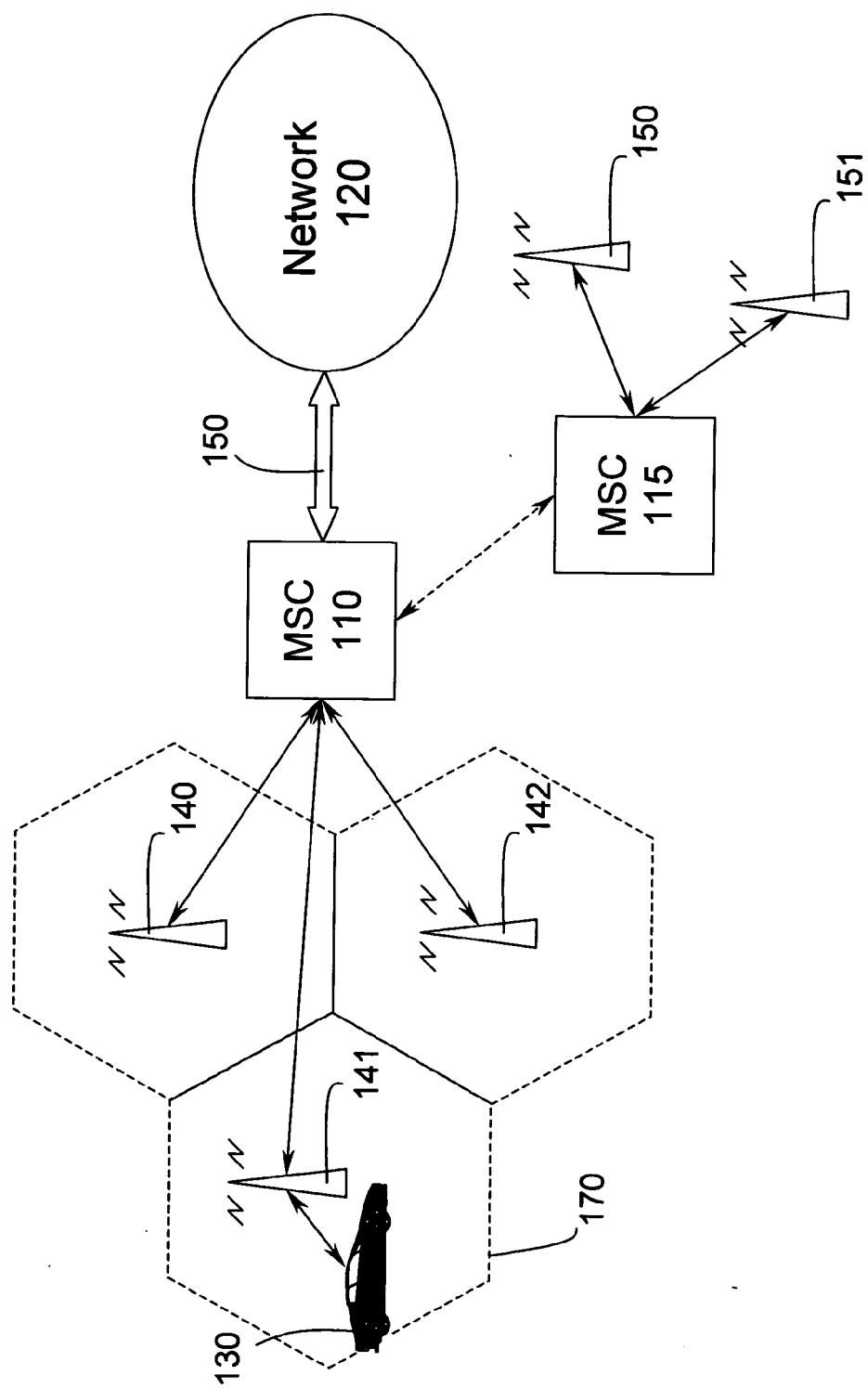
FIG. 1 illustrates a typical cellular network.
Figure 2:
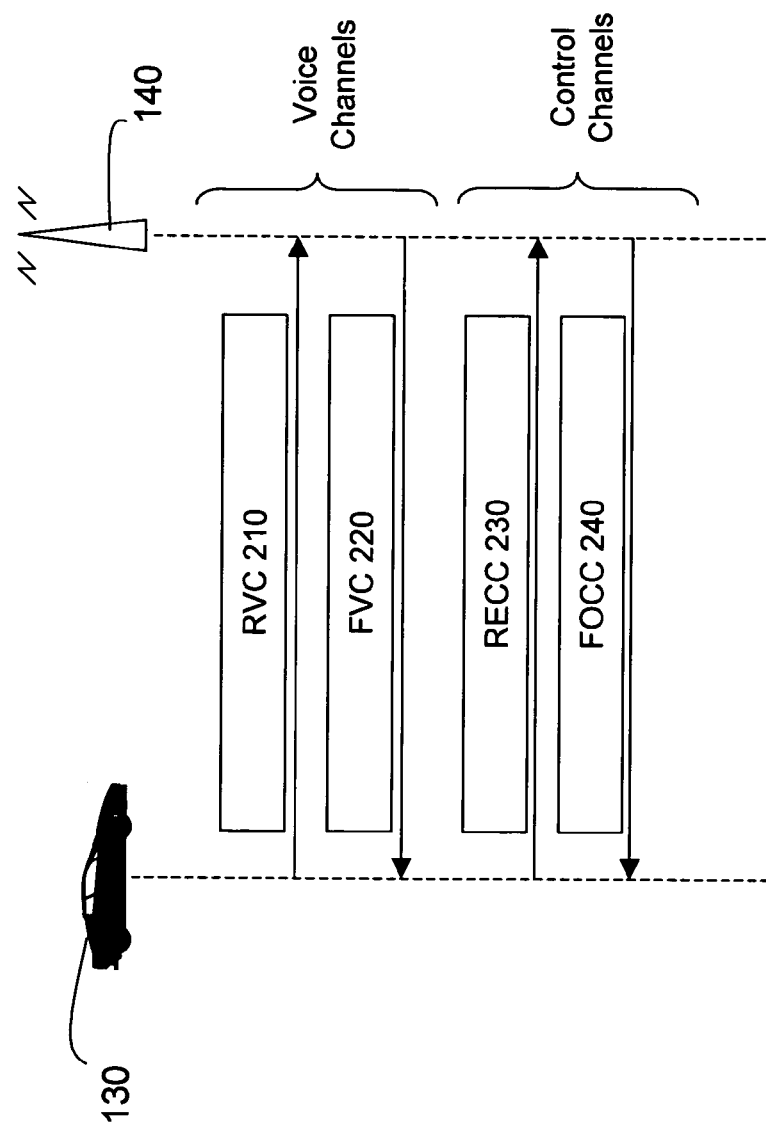
FIG. 2 illustrates the breakdown of voice channels and control channels on a cellular network.

Starting at step 410, the mobile RF device sends a packet to a host computer (the "host") requesting a response from the host, specifically, a cellular page acknowledging the packet. The host computer may be maintained by the organization employing the system and method described herein and may be continually updated to include a current list of SIDs for cellular carriers which provide the service. In one embodiment, communication between the RF module and host occur across a network such as network 120 of FIG. 1. If the mobile RF device is in a market which provides the service, the host will receive the request packet and will send a cellular page response back (i.e., to the cellular provider), resulting in a page to the mobile unit (i.e., over the FOCC).

After the mobile device transmits a packet/page request, it waits for a response (step 415). The wait time may be adjusted within the RF device based on the particular application for which the device is being used. In any case, a wait time should be long enough to ensure that the packet has the time to traverse the network—both ways—and be processed by the host. If the mobile device receives a response, then it is in a market which provides the service and it is "done" (step 425). The RF device (i.e., the application running in the device) updates its SID table accordingly so that it does not need to run the "urgent" process again the next time it enters the market.

If a response is not received in the predetermined time period, the RF device switches to the alternative frequency block (step 430) and sends another packet requesting a response from the host (step 435). Once again, if the mobile device receives a response to the second transmission, it is "done" (step 450) and the mobile unit's software and/or firmware (or any combination thereof) should update the SID table accordingly.

If a response is not received to the second transmission, the device is not in a market which provides the service (step 455). As such, the RF module application must use other means to send the data or store it for a future transmission time when coverage is available.

Search System and Method

Under normal operation, one embodiment of an RF module 600 listens for cellular pages sent in a predetermined Number Plan Area ("NPA") range. An NPA value represents an area code when used by a traditional cellular phone. In one embodiment of the present system and method, however, an NPA value is selected which is not an area code assigned to any location in the United States. Accordingly, detecting this predetermined NPA value identifies the data associated therewith to the present system and method.

One specific embodiment uses an NPA value of 175. Accordingly, when an RF module hears a page using an NPA value of 175, even if it is directed to another RF device, it reports that it has entered a market which provides the service (i.e., because the 175 NPA page would not have occurred unless the device was in such a market). This report can be used by the mobile unit's application software/firmware to update the SID table entry associated with that market.

It should be noted that some RF modules may be equipped to only hear either even or odd incoming pages, matching their programmed mobile identification numbers ("MINs") of which the NPA is a component. Therefore, if this type of an RF module has an odd MIN, it can only listen to incoming pages to other odd MINs.

In one embodiment, the RF modules contain firmware and/or software which directs the RF module to switch between block A and block B, using a pre-determined "listen" time (e.g., 15 minutes per block) during which the RF module listens for NPA 175 pages in each block. In addition, the search on block A and block B can be controlled directly by an application running the host over the data interface (i.e., across network 120) to the RF module. This embodiment may provide more precise control of the search timing—particularly if the application wants to intelligently check one frequency block for a longer time than the other frequency block.

Figure 5:
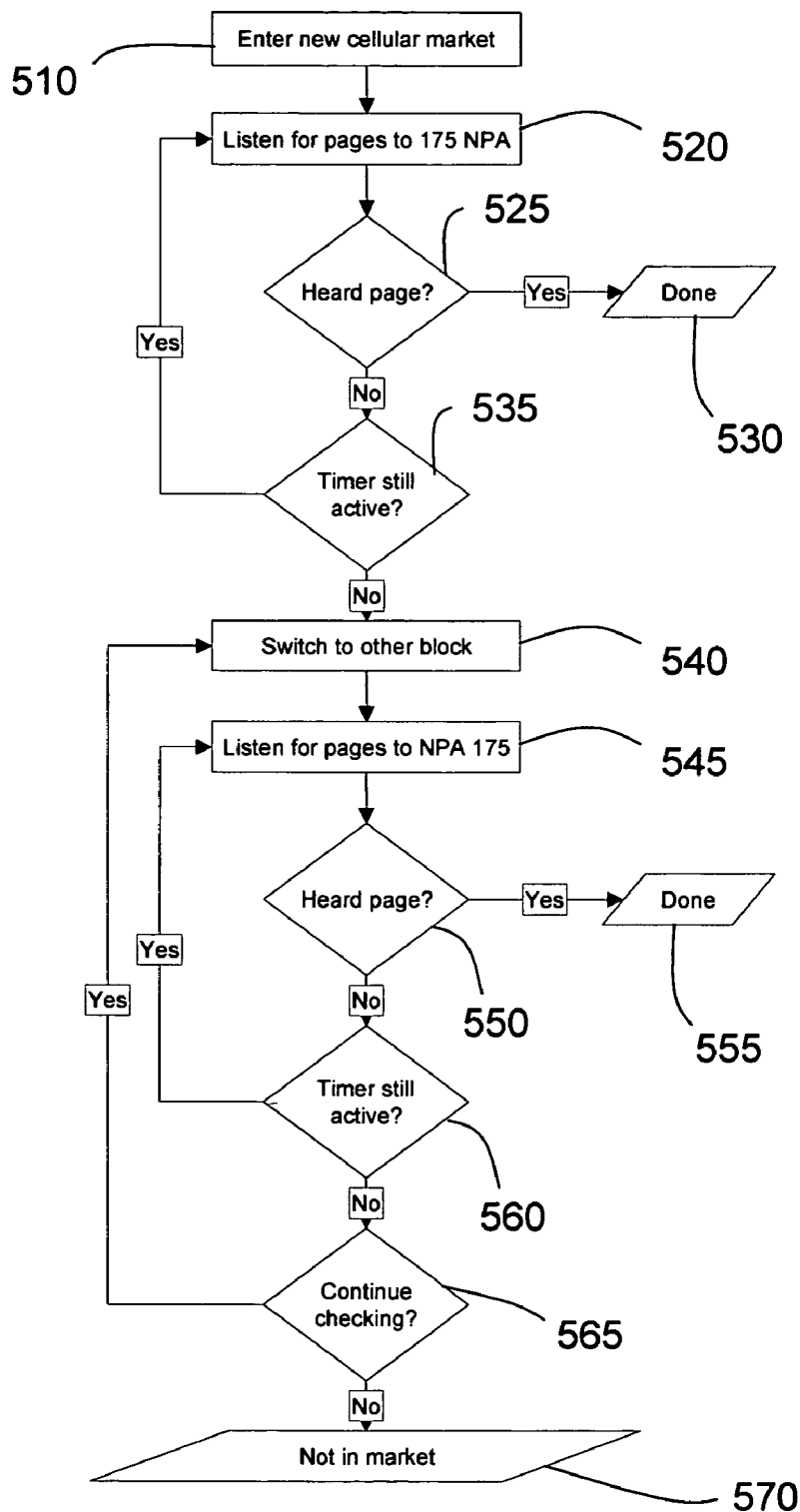
FIG. 5 illustrates a flowchart which sets forth additional features of the invention.

Referring to FIG. 5, in the "search" process, the RF module notes the SID (indicating a new market) at step 510 and listens for pages sent to any 175 NPA (even or odd), including pages to other devices (step 520). If, in a predetermined period (e.g., 15 minutes), it hears such a page, it reports the service availability and the process is "done" (at step 530). The mobile unit's firmware and/or software updates the SID table accordingly. If the timer expires without hearing such a page (determined at step 535), it switches to the other frequency block (step 540) and listens for even or odd pages to the 175 NPA (step 545).

If, in the other block, it hears a page, it reports the service availability and the algorithm is "done" (step 555) and the mobile unit's firmware and/or software updates the SID table accordingly. If the device still does not hear a page, however, it must decide whether to continue searching by switching back and forth between the frequency blocks, or terminating the search. If the search is terminated, the device may either use alternative means to send the data, store the data for a future transmission, or enter the "beacon" process (described below).

It is important to note that the effectiveness of the "search" process is directly related to the number of RF devices employing the system and method described herein. On any given SID there may only be a few units available and many of them may be off and/or not sending/receiving data. Therefore, during the initial period of service deployment the "search" process may be limited. However, as more RF units are deployed, the "search" process may provide the best mechanism for updating SID tables for non-critical situations.

Figure 7:
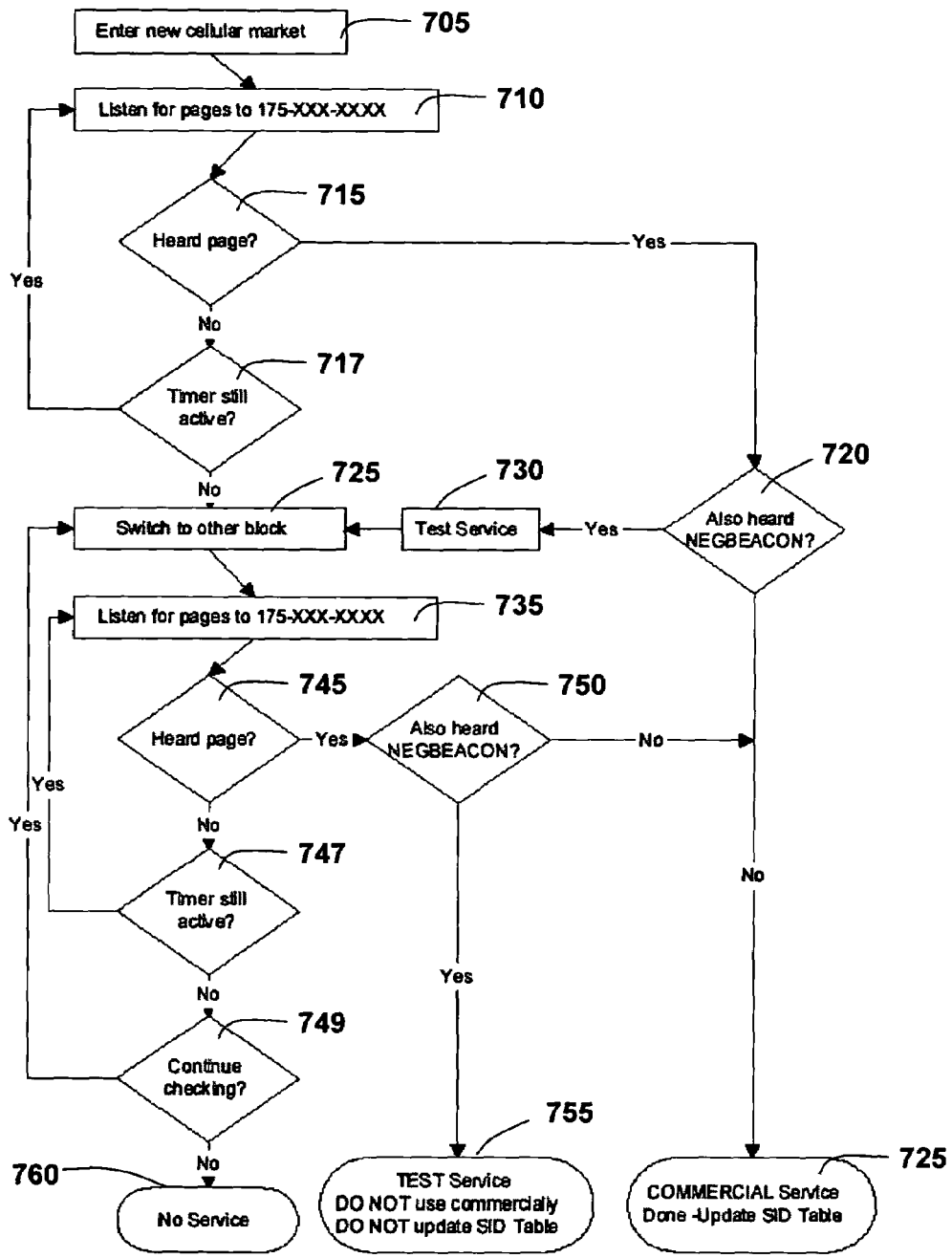
FIG. 7 illustrates an embodiment of a search process.

Another embodiment of a search process is illustrated in FIG. 7. At step 705 the RF module notes the SID indicating a new market and, at step 710, listens for pages sent to any 175 NPA (even or odd), including pages to other devices. If, in a pre-determined period (e.g., 15 minutes), it hears such a page (at 715), it then determines whether the type of page which was heard (at 720). Specifically, in one embodiment, the RF module is capable of distinguishing between commercial pages, indicating that service is available, and test and/or negative pages, indicating that service is not available. These test/negative pages may accompany normal pages, and may be generated by the organization employing the system and method described herein. One such type of page is described below as a Negative Beacon, or NEGBEACON, page. If it is determined at 720 that the page was not a test/negative page (and/or was not accompanied by a test/negative page) then at 725 the process is complete and the RF module updates it's SID tables accordingly.

If the RF module does not hear a page for a predetermined period of time at 717, or if the RF module hears a negative page at 720, then at 735, it switches to the other frequency block and listens for even or odd pages to the 175 NPA. If, at 745, it hears a page, it then determines, at 750, whether the page was a test/negative page or was accompanied by a test/negative page. If so, the RF module determines that it is not in a commercial market (at 755) and the process is complete. In an alternative embodiment (not shown in FIG. 7) the RF module may switch back to the original frequency block if it did not previously hear a test/negative page in that block (i.e., if it arrived at 735 from decision block 717, and not 730). If, however, the page heard by the RF module was not a test/negative page (and/or was not accompanied by a test/negative page) then, at 725, the module concludes that it is in a commercial service and updates its SID tables.

If the RF module does not hear a page at 745, and if the timer is still active (determined at 747), it continues listening in the frequency block. If, however, the period of time in the frequency band has elapsed it determines whether it should continue checking at 749 (i.e., based on how it is programmed). This decision may be based on whether (and how many previous times) the RF module has listened for pages in the different frequency blocks. If the decision is to continue checking, the module switches to the alternate frequency block at 735; if not, it determines that no service is available at 760.

Beacon System and Method

Recognizing that, in some instances (e.g., the early days of deployment), the "search" system and method may not yield consistent results, an additional system and method may be used to determine service coverage. These include the network request beacon page; the network recurring beacon page; and the network exception beacon page.

Network Request Beacon Page. In one embodiment, the packet format of fifteen 9s ("999999999999999") is reserved for the Dialed Digits data field of the packet as a means for the mobile unit to request the service network (e.g., the host) to send a beacon page (i.e., format 175-xxx-xxxx) to its current SID. This encoding is not likely to be seen in standard cellular transmissions (e.g., in a mobile GPS-based application).

The service provider (i.e., the organization providing the system and method described herein) may set restrictions on usage of the "beacon" feature. For example, in one embodiment, a beacon request is provided at no charge only if the mobile unit is configured with a SID table with a minimum number of entries (e.g., 700) and/or performs at least one "search" process cycle and/or updates its SID table after the receipt of the network beacon page once a service determination is made (i.e., such that it no longer needs to send the specially formatted packet when it later reenters that same market).

In one embodiment, the service provider responds to the network request beacon pages at predetermined time periods (e.g., on the quarter hour in which the request was received).

Network Recurring Beacon Page. Using this method, the service provider sends a beacon page (175-xxx-xxxx) to all SIDs that have been added to the service provider's coverage area after the initial SID table definition. Using this method, the service provider may choose not to send a beacon page to all SIDs on the list.

Network Exception Beacon Page. A third method, network exception beacon page, continually monitors service traffic in each SID and, if no page has been sent to a SID in a predetermined time period (e.g., 14 minutes) where there is an RF module newly registered, it automatically sends a beacon page (format 175-xxx-xxxx) to that SID.

Types of Coverage Beacon Pages. As described briefly above, embodiments of the invention may include different beacon page types: positive beacons ("POSBEACONs") and negative beacons ("NEGBEACON'). A positive beacon is a forward page which tells the RF module that commercial service is available. It includes a known NPA (as described above) which is a component of a MIN. Because some RF modules may be equipped to only hear either even or odd incoming pages, matching their programmed MINs, two types of beacon pages may be implemented: odd beacon pages (e.g., 175-989-9999) and even beacon pages (e.g., 175-989-9998).

A NEGBEACON is a forward page that indicates the unavailability of commercial service in the particular frequency band in which it is heard. This may mean that the cellular market has non-commercial coverage or test coverage. Non-commercial coverage may mean that the broadcast SID ("BSID") is undergoing commercialization but has not yet been fully certified as commercial (e.g., the installation of the system and method may be in progress or the installation may be complete but commercial designation is pending during final network testing).

Test markets (which may be identified as such in the SID Table) are markets in which service is available for engineering tests, cellular carrier evaluations and limited Developer use, but not for use by Application Developers with commercial Applications.

In one embodiment, in test and other non-commercial markets where normal pages might otherwise be misinterpreted as POSBEACON pages, a NEGBEACON will be sent at or about the same time as the normal page (e.g., within 30 seconds) to indicate that the market is non-commercial.

Figure 9:
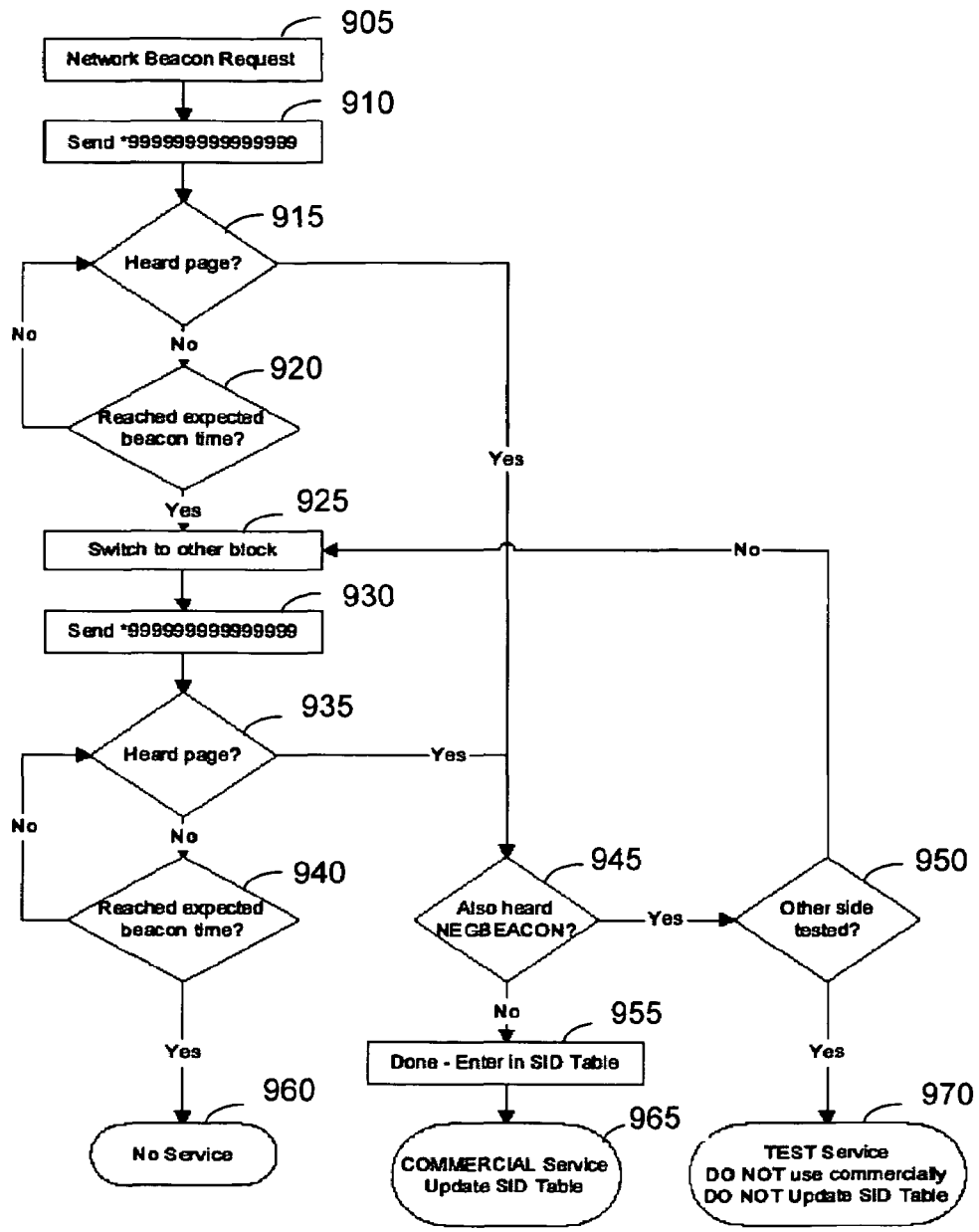
FIG. 9 illustrates an embodiment of a process for making a coverage determination.

Coverage Determination Request. A Coverage Request according to one embodiment is a specially formatted reverse data packet sent from a commercially certified RF module to request a coverage determination response from the organization employing the system and method described herein. One embodiment of a process for making a coverage determination is illustrated in FIG. 9. At 910, the RF module broadcasts a coverage determination request. The coverage determination request packet may be a reserved data format which is highly unlikely to be used for other applications (e.g., a * followed by fifteen 9s).

If the RF module hears a response page (determined at 915) the RF module then determines whether it was a NEGBEACON response and/or whether a NEGBEACON response was heard in addition to the response page (step 945). If not, then the RF module determines that it is in a commercial service area and updates its SID table accordingly (at 955). If a NEGBEACON page was heard, however, the RF module switches to the alternate frequency block (step 925) if the other frequency block has yet to be checked (determined at 950), or alternatively determines that the RF module is in a test area (at 970) if the other frequency block has been previously checked. If the RF module spends a predetermined amount of time checking both frequency blocks and receives no response, then it determines that no service is available in the area (at 960).

As described above, the response page may be in the form of a POSBEACON or a NEGBEACON, depending on whether service is available. Because a market may have coverage available for test and commercial purposes, the table illustrated in FIG. 8 identifies a plurality of responses to a coverage determination request.

In one embodiment, the coverage determination request capability, and the appropriate response, is available at no charge as long as the RF device and the application running thereon has been certified as meeting certain minimum standards. These standards may include, for example, that the RF device has a SID table with a minimum number of entries; updates a BSID entry to be valid for a minimum of 1 year, after receipt of a POSBEACON; makes a maximum number of successful requests within a time period from the same BSID; uses a real time clock that maintains an accuracy of ±1 minute over its specified; and/or has a temperature range for the maximum time allowed between updates (e.g., using GPS, if available).

Once an RF module has positively determined that commercial service is available, it should store the SID in its SID Table such that it no longer needs to send the specially-formatted packet when it later re-enters that same commercial BSID. In one embodiment, the organization employing the system and method will bill organizations/individuals using the system for each POSBEACON sent in response to each coverage determination request after a maximum number per year (e.g., with a rolling one year window) made from the same MIN in the same commercial BSID. In one embodiment, only coverage determination requests made from the same commercial BSIDs will count against the per year maximum. In addition, requests made from BSIDs with test or non-commercial service may not be counted as long as the reasonable discretion is used in making such requests (for example, no more than one per day).

Coverage Determination Request Response Timing. In one embodiment, the organization implementing the system and method described herein will respond to coverage determination requests with a POSBEACON or NEGBEACON page on the quarter hour (or other fraction of the hour) in which the request was received: (e.g., HH:15, HH:30, HH:45, HH:00, universal time coordinates ("UTC")) for requests received from the A-block, and 7.5 minutes later (HH:07:30, HH:22:30, HH:37:30, HH:52:30) UTC for requests received from the B-block. However, in one embodiment, if a 175-XXX-XXXX forward page is sent after the request is received and before the POSBEACON forward page would have normally been sent (A- or B-block), another POSBEACON forward page will not be sent at the specified time. This is because a normal forward page anytime during that interval effectively performs the same function as the POSBEACON. Accordingly, in this embodiment the application may stay on and listen for forward pages during the interval from the time a coverage request is made until a few minutes after the normal time (A- or B-block) when the POSBEACON page is due (i.e., an RF module should not make a coverage determination request and then turn off until a few minutes before the next scheduled beacon time).

Different policies may be applied to battery operated modules. For example, battery operated modules may be configured to wake up slightly more than a few minutes before normally scheduled beacon times to make a coverage determination request, and listen until a few minutes after the normally scheduled beacon time, or shortly after hearing a forward page sent to 175-XXX-XXXX. The RF module application in on embodiment should stay on an additional quarter hour to hear a response if the request is sent within a few minutes before the normally scheduled beacon time and should stay awake until a few minutes after the time it expects to hear a response. If an intervening forward page to another RF device is sent (without an accompanying NEGBEACON page), then the RF module may stop listening at that point without waiting for the next quarter hours since the normal page will be deemed a POSBEACON.

In one embodiment, if a request is received within one minute of any normal beacon time, the organization implementing the system and method described herein will delay sending the beacon response until the next normal beacon time. In a test service area it is possible that a 175-XXX-XXXX forward page will be sent while the RF module application is listening for a 175-XXX-XXXX forward page in search mode or is listening for a response to a coverage determination request. In test and non-commercial areas all forward pages may be followed by a NEGBEACON. Therefore, when using the search or beacon algorithms, upon receipt of a normal forward page (treated as a POSBEACON), the RF module application should wait for a short period (e.g., 30 seconds) before deciding if the service area is commercial or test/non-commercial.

Recurring POSBEACON for New Commercial BSIDs. Once a day (e.g., at 09:00UTC if the market is on the A-block; and 09:30UTC if the market is on the B-block), the organization employing the system and method described herein will send a POSBEACON forward page to new markets that have achieved commercial status since the last quarterly SID table update. In one embodiment, two POSBEACON forward pages will be sent to each market at the specified time, addressed to the selected even and odd MINs (e.g., MINs 175-989-9998 and 175-989-9999), unless a forward page to a 175-XXX-XXXX MIN is sent as a substitute during the middle eight minutes of the POSBEACON time window (see next paragraph) of 12 minutes.

In one embodiment, an RF module application desiring to hear this POSBEACON should turn on shortly (e.g., 6 minutes) prior to the scheduled time (08:54UTC on the A-block and 09:24UTC on the B-block) and stay on till shortly (e.g., 6 minutes) after the scheduled time (09:06UTC on the A-block and 09:36UTC on the B-block). To account for clock skews between the Application and the HLR of the organization implementing the system, only a forward page to a 175-XXX-XXXX MIN will be considered a substitute if it occurs a few minutes before or after the scheduled POSBEACON times (9:00UTC and 9:30UTC). The POSBEACON forward pages will only be sent to a new market for a predetermine time period (e.g., 180 days) after its achieving commercial status. At that time, RF modules entering that BSID must rely on other algorithms for determining coverage.

Monthly Beacons. In addition to the Coverage Determination Request and recurring POSBEACON for new commercial markets, in one embodiment monthly beacon sequences may also be used to make changes to RF devices' SID tables on-the-fly. The sequences may be sent to all A-block markets at one time (e.g., starting at 10:00UTC) on the first day of each month; and to all B-block markets at another time (e.g., starting at 10:30UTC) on the first day of each month.

Different types of monthly beacons may be implemented. In one embodiment, beacon types include SIDADD, SIDREMOVE, SIDSHAREADD, SIDSHAREREMOVE, and SIDNULL, each of which are described in detail below. Each of the different beacon types may be sent in a predetermined order. In one particular embodiment, the order is SIDADD (if any), SIDREMOVE (if any), SIDSHAREADD (if any), and SIDSHAREREMOVE (if any). For example, if the current month includes two BSIDs to be added to coverage, but no BSIDs are being removed from coverage, identified as shared, or removed as shared, then the monthly beacon sequences for that month will start with and consist of two SIDADD beacon sequences only. Likewise, for example, if the current month includes only one SIDSHAREREMOVE, then the monthly beacon sequence for that month will start with and consist of only a single SIDSHAREREMOVE beacon sequence. If there are no other beacon sequences for any given month, then two SIDNULL beacon pages will be sent.

In one embodiment, the SIDADD beacon sequence consists of two forward pages (SIDADD1 and SIDADD2) sent to all A-block markets that have coverage and all B-block markets that have coverage. Note that four forward pages (two two-forward-page sequences) will actually be sent into each market area for each block: the first two-page sequence that can be heard by RF devices with odd-numbered primary MINs and the second two-page sequence that can be heard by RF devices with even-numbered primary MINs. The SIDADD beacon sequences may be part of the monthly beacon sequences sent to all markets once a month.

As an example, an RF device with Primary MIN 175-421-1234 (even numbered) is located in BSID 41 (odd numbered—therefore A-block). The organization implementing the system and method will notify its application developers (i.e., those developing applications for the RF device) that BSID 37 has been added to commercial service. An RF device with Primary MIN 175-421-1234 must listen (wake up if in sleep mode) for the SIDADD beacon sequence during a particular time period (e.g., from 9:54UTC to 10:06UTC) on the first day of the month. During that time, the following BEACON sequence (which can be received in either order) will be broadcast into all markets: Page to 175-989-8002 (SIDADD1); Page to 175-989-0376 (SIDADD2).

In the event that a BSID carrier decides to cease providing coverage, a special SIDREMOVE beacon may be transmitted to all markets for a specified time period (e.g., once a month for up to 6 months before the actual termination date and for 3 months after the actual termination date), following notification to the application developer (using the SID Table update process) that the BSID is being deleted from coverage.

A BSID can be removed in a situation where coverage will not be impacted. Occasionally, a carrier will decide to consolidate BSIDs in order to achieve a larger local calling area for their voice services. When that happens, one or more BSIDs may be removed from the network and replaced with another BSID—which is typically already in place. The SIDREMOVE beacon may be used in this situation as well.

The SIDREMOVE beacon sequence may consist of two forward pages (SIDREMOVE1 and SIDREMOVE2) sent to all A-block markets that have coverage and all B-block markets that have coverage. Note that four forward pages (two two-forward-page sequences) will actually be sent into each market area for each block: the first two-page sequence that can be heard by RF devices with odd-numbered Primary MINs and the second two-page sequence that can be heard by Devices with even-numbered Primary MINs. The SIDREMOVE beacon sequences may be part of the monthly beacon sequences sent to all markets once a month.

For various reasons—primarily to create larger "home" calling areas—some carriers have banded together to form "virtual carriers" in selected markets. This activity has resulted in a number of BSIDs that are shared between carriers. This results in a situation where part of the BSID area does not provide coverage since it is covered by one carrier; and part of the BSID area does provide coverage since is covered by a second carrier.

To address this issue, SID tables may include a SHARED SID flag: when TRUE, a BSID is shared by a carrier and a non-carrier, which means that the BSID has coverage only in selected areas of its footprint; when FALSE, a BSID is unique for one carrier OR is shared between two carriers, which means that the BSID has coverage everywhere in its footprint.

While the SID tables may be updated with a field that identifies a Shared Broadcast SID (or not), the cellular marketplace is very dynamic. It is possible that other market areas will strike shared SID agreements in the future. Therefore, one embodiment of the system and method provides a mechanism for dynamically identifying newly identified Shared BSIDs via the SIDSHAREADD beacon sequence. This beacon sequence will be sent to all markets (e.g., once per month for the 3 months) following notification to the application developer that the BSID is a Shared BSID.

Likewise, as coverage for the present system and method is expanded, it is entirely likely that a shared SID situation will be resolved by the inclusion of certain carriers into the coverage footprint. Therefore, one embodiment will also provide a mechanism for dynamically identifying BSIDs that are no longer shared via the SIDSHAREREMOVE beacon sequence (i.e., in the event that coverage is available everywhere in its footprint). This beacon sequence may be sent to all markets (e.g., once per month for the 3 months) following notification to the RF application developer (e.g., using the SID table update process) that the BSID is no longer a Shared BSID.

In one embodiment, the SIDSHAREADD beacon sequence consists of two forward pages (SIDSHAREADD1 and SIDSHAREADD2), sent to all A-block markets that have coverage and all B-block markets that have coverage. Note that four forward pages (two two-forward-page sequences) will actually be sent into each market area for each block: the first two-page sequence that can be heard by RF devices with odd-numbered primary MINs and the second two-page sequence that can be heard by RF devices with even-numbered primary MINs.

Likewise, The SIDSHAREREMOVE beacon sequence may consist of two forward pages (SIDSHAREREMOVE1 and SIDSHAREREMOVE2) sent to all A-block markets that have coverage and all B-block markets that have coverage. Note that four forward pages (two two-forward-page sequences) will actually be sent into each market area for each block: the first two-page sequence that can be heard by RF devices with odd-numbered primary MINs and the second two-page sequence that can be heard by RF devices with even-numbered primary MINs.

It is possible that there will be no beacon sequences in any given month. To reduce the time an RF device might decide to wait to hear a beacon sequence, one embodiment of the system and method includes a SIDNULL beacon page. The SIDNULL beacon is a single-forward-page sent to all A-block markets that have coverage and all B-block markets that have coverage. Note that two forward pages may actually be sent into each market area for each block: the first page can be heard by RF devices with odd-numbered primary MINs and the second page can be heard by RF devices with even-numbered primary MINs. The SIDNULL beacon page will replace the normal SIDADD, SIDREMOVE, SIDSHAREADD and SIDSHAREREMOVE sequences sent to all markets once a month if necessary.

Exemplary Min Masks for SID Table Updates

In one embodiment it is the responsibility of the RF module application to perform URGENT, SEARCH, and BEACON (including SIDADD, SIDREMOVE, SIDSHAREADD and SIDSHAREREMOVE BEACONs) algorithms. When the application uses the SEARCH and BEACON algorithms, then two (of the nine available) Secondary MIN masks MAY be used for SID table updates: Mask 8 may be set to wildcard MIN 175-989-AAAA; Mask 9 may be set to wildcard MIN 175-AAA-AAAA. This mask may be used if the RF device's coverage determination algorithms are not used or are unavailable. Otherwise, the RF device, and not the application, can search for any forward page to 175-XXX-XXXX, indicating service availability.

In one embodiment, a forward page match to wildcard Mask 8 with 175-989-999(8/9) reported indicates the occurrence of a POSBEACON and the presence of commercial service. A forward page match to wildcard Mask 8 with 175-989-999(0/1) reported indicates the occurrence of a NEGBEACON and the presence of test (or non-commercial) Micro-Burst service.

In one embodiment, a forward page match to Mask 9 indicates service. If a NEGBEACON then occurs within a predetermined time period (e.g., 30 seconds), then it is test (or non-commercial) service area. However, if no NEGBEACON occurs after this time period, then it is commercial service area.

Min masks may also be employed with respect to the various beacon pages described above (e.g., SIDADD, SIDREMOVE, SIDSHAREADD and SIDSHAREREMOVE).

SID Table Management

SID tables must be managed (e.g., updated) after the mobile device is deployed in the field. In particular, table management rules and methods may be incorporated in the RF device application program (e.g., based on the needs and available host processor power and/or data storage capacity) to ensure that the tables are accurate.

As mentioned earlier, when a device makes a "successful" service determination (e.g., the process is "done"), it may use the information to store and/or update the corresponding entry in the SID table. In one embodiment of the system and method, the module application program may also choose to use a "failed" service determination (e.g., particularly when using the "urgent" algorithm) to discard or invalidate out-of-date entries in the table.

Number of SID Table Entries. The first item to be considered for table management is the number of entries in the SID table. Storing every SID in the North American continent (about 2500 SIDs) is probably not necessary (depending on the application) and consumes a substantial amount of memory. Application developers should instead examine the specific application needs and balance those needs against production and installation requirements. For example, if the application is intended for a regional truck dispatch the device is likely to stay in the same market for extended periods. By contrast, if the device is operated in trucks in the long haul trucking industry, the device may move through 10 markets in a single day. Similarly, an application device may be constrained to only move in certain regions (e.g., mounted on a railway engine). This limits the number of SID values to which it is likely to be exposed during normal operation.

In essence, the application developer may choose to determine how many SID numbers the mobile device is likely to "hear" during normal operation and plan accordingly—with room for expansion based on the needs of the application. As described above, a shared SID Flag (e.g., 1=shared; 0=not shared) may be included in the SID Table.

Unlike the United States, the two Canadian cellular carriers (one for the A-block and one for the B-block) provide nationwide coverage. There is no concept of MSAs/RSAs in Canada for this reason. This true duopoly situation simplifies the coverage determination algorithm for Canada. One embodiment of the system will operate on one of the two frequency blocks in Canada, e.g., the A-block. Therefore, if an RF application sees a BSID in the range of 16384 through 18431 (inclusive) that is odd-numbered, then that BSID has available service. The use of additional algorithms may not be necessary. An SID table note accompanying each SID Table release will include a specific note on the availability of Canadian coverage, although the SID table will not include each Canadian BSID.

In the event that service is discontinued in Canada, a SIDREMOVE beacon page will be sent to "remove" BSID 16385. While this BSID may not actually be in the SID Table, it is serving as a proxy for Canadian service. The Application should interpret this SIDREMOVE beacon sequence as an instruction to discontinue the use of the Canadian algorithm described above, that is, service is being discontinued from all odd numbered BSIDs between 16384 and 18431 (inclusive). For example, assume Canadian service is to be discontinued in 6 months. Devices with even numbered primary MINs would see the following broadcast at 10:00UTC on the A-block on the first day of the month: SIDREMOVE1=Page to 175-989-6162; SIDREMOVE2=Page to 175-989-3856.

Another reason for the RF application to use this algorithm for coverage determination in Canada is that the Canadian cellular carrier is constantly changing the BSID numbers broadcast into their markets. This dynamic environment does not enable accurate SID table entries to be maintained for Canada (at this time).

The Mexican cellular environment is a hybrid of the U.S. and Canada. Mexico is segmented into nine market areas. On the A-block, there are multiple companies providing service for one or more of these nine market. On the B-block, there is only one carrier for the entire country. In one embodiment, the system and method described herein will be employed on the B-block. In this embodiment, at least two strategies may be applied for future coverage determination in Mexico: If the Application sees a BSID in the range of 24576 through 25599 (inclusive) that is even-numbered, then that BSID has coverage. The use of additional algorithms is not necessary.

The SID Table has specific Broadcast SID entries for each market area in Mexico. Mexican BSID entries may be handled in a similar manner to U.S. BSID entries. If service is discontinued in Mexico, appropriate SIDREMOVE pages may be sent to remove BSID 24576. The RF application should interpret this SIDREMOVE sequence as an instruction to assume service is being discontinued from all even numbered BSIDs between 24576 and 25599 (inclusive). For example, assume Mexican service is to be discontinued in 6 months. Devices with even numbered primary MINs might see the following broadcast at 10:00UTC on the A-side Carriers on the first day of the month: SIDREMOVE1=Page to 175-989-6242; SIDREMOVE2=Page to 175-989-5766.

Maximum Table Entries. Notwithstanding the above discussion, if the application has the capacity and the service provider provides sufficient storage capacity, a minimum level of SID entries may be required (e.g., 700 SID entries). In one embodiment, use of the "beacon" page function (described in detail above) may be conditioned upon a minimum number of SID table entries.

Entry Lifetimes. This feature is particularly relevant for SID tables that do not implement a comprehensive set of SID table entries (e.g., covering a footprint for the U.S. and Canada). It is most useful for phasing out SIDs that do not get used very often versus those that do. This feature may also be referred to as "caching" of SID table entries.

In this embodiment, a "time-to-live" ("TTL") value for each SID table entry is recorded and continually updated. This TTL value should not be too short or too long. If too short, the need for validating SID table entries on a more frequent basis is increased. If too long, the application may find invalid entries in the SID table and unsuccessfully attempt service transmissions in a market where service is not available.

A reasonable value for a SID entry TTL is probably one or two years for most applications. This provides a reasonable balance between the update and the possibility of inaccuracies.

SID Entry Match Count. This feature is also particularly relevant for SID tables that do not include a comprehensive set of SID entries. The RF module application program records the number of successful SID matches ("hits") when service is determined, along with the TTL.

Such a "match count" is increased every time the SID is matched by a successful service determination and improves the "quality" of the entry. Then a TTL expiry decreases the hit count rather than deleting the SID entry entirely. This allows the mobile device to spend longer periods in a region, with occasional larger moves in between (such as might be experienced by a rental or leased vehicle).

The hit count can also have maximums to prevent gross errors. Moreover, the TTL value can be reduced since the entries are validated more granularly. A balance between the hit count maximum and the size of the TTL can be set to ensure that the table entries are not invalidated too quickly. The initial value of the hit count can be set to a known state that allows the device to "settle in" over time.

The application may also choose to use a service determination failure to reduce the hit count more dramatically than a TTL expiry. For example, if an "urgent" algorithm fails, the hit count may be reduced to zero.

In short, the overhead of extra storage associated with keeping a hit count is more than offset by the improvement in the quality of the SID table entry and the resulting ease in determining the availability of service.

SID Entry States. If hit counts are not used, and the full SID list is included in memory, each entry may be tagged with multiple known states such as "Active," "Contracted," and/or "Not Contracted." In this embodiment, the multiple states may then be used to make decisions regarding whether to try the "urgent" process or not.

SID Entry Intelligent Grouping. For particular applications (e.g., geo-fencing or auto-theft applications), nearby SIDs can be grouped with the most actively used SID (e.g., including using hit counts). This embodiment allows quicker switching to the correct frequency block carrier, for example, in the event a vehicle is stolen. Using this embodiment, the vehicle will be ready to transmit data immediately when moving from one adjacent market to another. This feature is not strictly necessary if the SID table is large enough to incorporate all the known SID values, but can nonetheless be helpful in determining a match in the data more rapidly.

The SID table operations may be uniquely tailored to the needs of each customer. For example, in long-haul trucking applications, the SID transitions for typical routes can be recorded and improved over time (again using the concept of hit counts). This allows predictive switching from one frequency block to the other, as the vehicle moves, and minimizes the time the device is not set to transmit data successfully. Once again, this feature is particularly useful if insufficient storage has been provided to store the entire SID table list.

Over-The-Air Updates. In many applications, the mobile device may also incorporate a traditional voice cellular unit and/or a traditional data modem. In this embodiment, the modem and cellular voice service may be used to connect to the mobile device and update the SID tables "over-the-air." This embodiment allows the entries to be validated once the RF device is deployed in the field without requiring it to be brought in for service.

Throughout the foregoing description, for the purposes of explanation, numerous specific details were set forth in order to provide a thorough understanding of the invention. It will be apparent, however, to one skilled in the art that the invention may be practiced without some of these specific details. For example, although described in the context of a system which uses cellular control channels to transmit packetized data, the underlying invention is not limited to such a system. Accordingly, the scope and spirit of the invention should be judged in terms of the claims which follow.

What is claimed is:

1. A method, comprising:
reading a first system identification number ("SID") broadcast in a first frequency band, the first SID identifying a cellular service provider;
determining whether the first SID matches a SID stored in a dynamically updated SID table, the SID in the table identifying a cellular service provider that supports an application that exchanges remote access application message (RAAM) data packets with a radio frequency (RF) module via cellular control channels;
switching to a second frequency band and reading a second SID broadcast in the second frequency band if the first SID does not match a SID stored in the SID table, wherein support for the application is identified if the first or second SID matches a SID stored in the SID table;
determining whether support for the application needs to be detected quickly if neither the first nor the second SID is identified in the SID table;
performing a first process to detect support for the application if support needs to be detected quickly; and
performing a second process to detect support for the application if support does not need to be detected quickly.

2. The method of claim 1, wherein the second process comprises:
listening for cellular pages having an NPA value in a first frequency band, the NPA value indicating that the cellular service provider broadcasting in the first frequency band supports the application.

3. The method of claim 2, further comprising, if the cellular page is not detected in the first frequency band within a period of time:
switching to a second frequency band and listening for cellular pages having the NPA value in the second frequency band, the NPA value indicating that the cellular service provider broadcasting in the second frequency band supports the application.

4. The method of claim 1, wherein the first process further comprises:
transmitting a page request packet in the first frequency band to a host across a cellular network; and
receiving a cellular page from the host in response to the page request packet, thereby identifying the cellular service provider broadcasting at the first frequency band as one which supports the application.

5. The method of claim 4, further comprising updating the SID table to include a SID of the cellular service provider from which the cellular page was received.

6. The method of claim 4, further comprising, if the cellular page is not received within a predetermined period of time:
switching to a second frequency band and transmitting a second page request packet to a host across a cellular network; and
receiving a cellular page from the host in response to the second page request packet, thereby identifying the cellular service provider broadcasting at the second frequency band as one which supports the application.

7. The method of claim 6, further comprising updating the SID table to include a SID of the cellular service provider from which the cellular page was received.

8. The method of claim 1, wherein the first and second frequency bands are cellular A and B bands, respectively.

9. An article of manufacture comprising a machine accessible medium including content that when accessed by a machine causes the machine to:
read a first system identification number ("SID") broadcast in a first frequency band, the first SID identifying a cellular service provider;
determine whether the first SID matches a SID stored in a dynamically updated SID table, the SID in the table identifying a cellular service provider that supports an application that exchanges remote access application message (RAAM) data packets with a radio frequency (RF) module via cellular control channels;
switch to a second frequency band and read a second SID broadcast in the second frequency band if the first SID does not match a SID stored in the SID table, wherein support for the application is identified if the SID in the first or second frequency bands matches a SID stored in the SID table;
determine whether support for the application needs to be detected quickly if neither the first nor the second SID is identified in the SID table;
perform a first process to detect support for the application if support needs to be detected quickly; and
perform a second process to detect support for the application if support does not need to be detected quickly.

10. The article of manufacture of claim 9, wherein the second process comprises:
listening for cellular pages having an NPA value in a first frequency band, the NPA value indicating that the cellular service provider broadcasting in the first frequency band supports the application; and
switching to a second frequency band and listening for cellular pages having the NPA value in the second frequency band, the NPA value indicating that the cellular service provider broadcasting in the second frequency band supports the application.

11. The article of manufacture of claim 9, wherein the first process comprises:
transmitting a page request packet in the first frequency band to a host across a cellular network; and
receiving a cellular page from the host in response to the page request packet, identifying the cellular service provider broadcasting at the first frequency band as one which supports the application.

12. The article of manufacture of claim 11, further comprising a machine accessible medium including content that when accessed by a machine causes the machine to update the SID table to include a SID of the cellular service provider from which the page was received.

13. The article of manufacture of claim 11, further comprising a machine accessible medium including content that when accessed by a machine causes the machine to, if the cellular page is not received within a predetermined period of time:
switch to a second frequency band and transmitting a second page request packet to a host across a cellular network; and
receive a cellular page from the host in response to the page request packet, identifying the cellular service provider broadcasting at the second frequency band as one which supports the application.

14. The article of manufacture of claim 13, further comprising a machine accessible medium including content that when accessed by a machine causes the machine to update the SID table to include a SID of the cellular service provider from which the page was received.

* * * * *